(12) United States Patent
Kuiper

(10) Patent No.: US 11,726,313 B2
(45) Date of Patent: Aug. 15, 2023

(54) DIRECTABLE LIGHT BEAM HANDLING DEVICE FOR OPTICAL COMMUNICATION

(71) Applicant: Nederlandse Organisatie voor toegepast-natuurwetenschappelijk onderzoek TNO, 's-Gravenhage (NL)

(72) Inventor: Stefan Kuiper, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 427 days.

(21) Appl. No.: 17/051,691

(22) PCT Filed: Apr. 29, 2019

(86) PCT No.: PCT/NL2019/050249
§ 371 (c)(1),
(2) Date: Oct. 29, 2020

(87) PCT Pub. No.: WO2019/212337
PCT Pub. Date: Nov. 7, 2019

(65) Prior Publication Data
US 2021/0116700 A1    Apr. 22, 2021

(30) Foreign Application Priority Data

Apr. 30, 2018  (EP) ..................... 18170184

(51) Int. Cl.
*G02B 26/08*    (2006.01)
*G02B 7/182*    (2021.01)

(52) U.S. Cl.
CPC ......... *G02B 26/085* (2013.01); *G02B 7/1821* (2013.01); *G02B 7/1828* (2013.01); *G02B 26/0883* (2013.01)

(58) Field of Classification Search
CPC .. G02B 26/085; G02B 7/1821; G02B 7/1828; G02B 26/0883; G02B 23/10; H04B 10/118
See application file for complete search history.

(56) References Cited

U.S. PATENT DOCUMENTS

| 3,011,124 A | 11/1961 | Hermann et al. |
| 2005/0168720 A1* | 8/2005 | Yamashita ............. G01S 17/36 356/5.01 |
| 2018/0095270 A1 | 4/2018 | Carothers et al. |

FOREIGN PATENT DOCUMENTS

| GB | 2327279 A | 1/1999 |
| WO | 03065080 A2 | 8/2003 |

OTHER PUBLICATIONS

Feb. 20, 2019, International Search Report and Written Opinion, NL2019/050249.

(Continued)

*Primary Examiner* — Euncha P Cherry
(74) *Attorney, Agent, or Firm* — Banner & Witcott, Ltd.

(57) ABSTRACT

A directable light beam handling device for use in optical communication contains is provided that contains a rotation mechanism with a rotatable ring of soft magnetic material encircling a path of the beam from a beam expander. A mirror or prism being coupled to the rotatable ring is rotated with the ring. The ring includes an array of soft magnetic ridges, forming elevations extending from a surface of the ring. At least three electromagnets are used to drive rotation of the ring around the beam axis. Each electromagnets comprises a soft magnetic yoke, having poles at a first and second end portion of the yoke. The pole at the first end portion faces said surface of the ring, the first end portion having ridges elevated from the yoke in the direction towards the ring, in parallel with the ridges of the ring.

13 Claims, 7 Drawing Sheets

(56) References Cited

OTHER PUBLICATIONS

D. Mussett et al., "Contraves Optical Treatment—Coarse Pointing Assembly (CPAS)," pp. 1-8, (2003).
G. Szekely et al., "A Course Pointing Assembly for Optical Communication," NASA/CP-2010-216272, pp. 99-108 (2010).
Craig Schwarze, "A New Look at Risley Prisms," OPTRA Inc., pp. 1-5, (2006).

\* cited by examiner

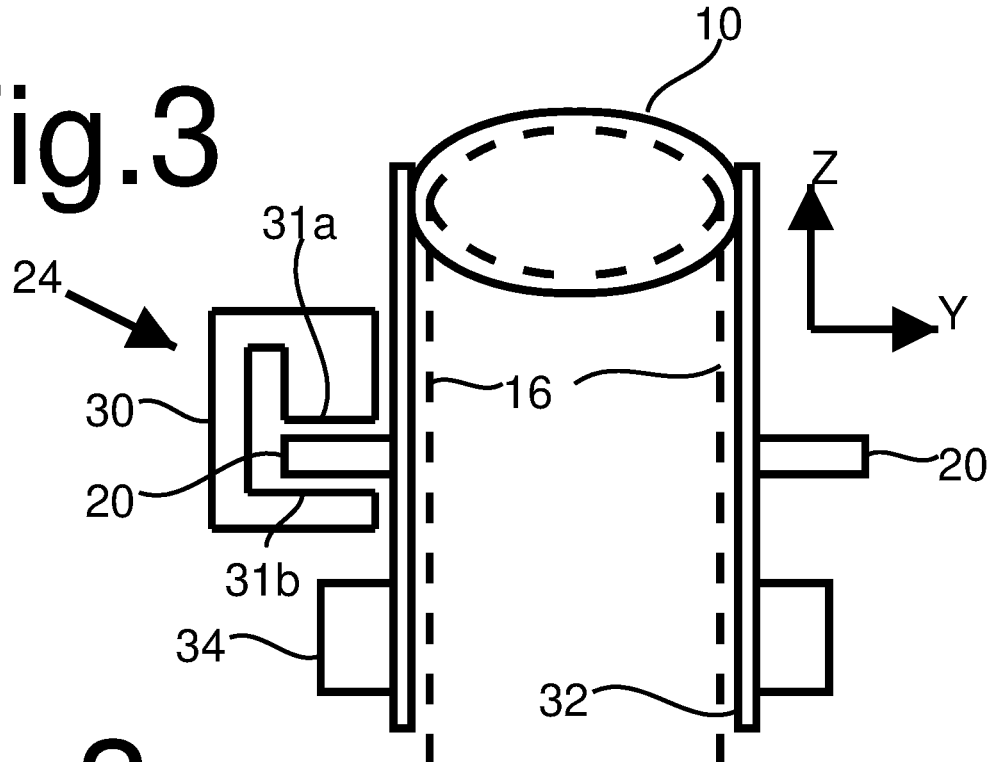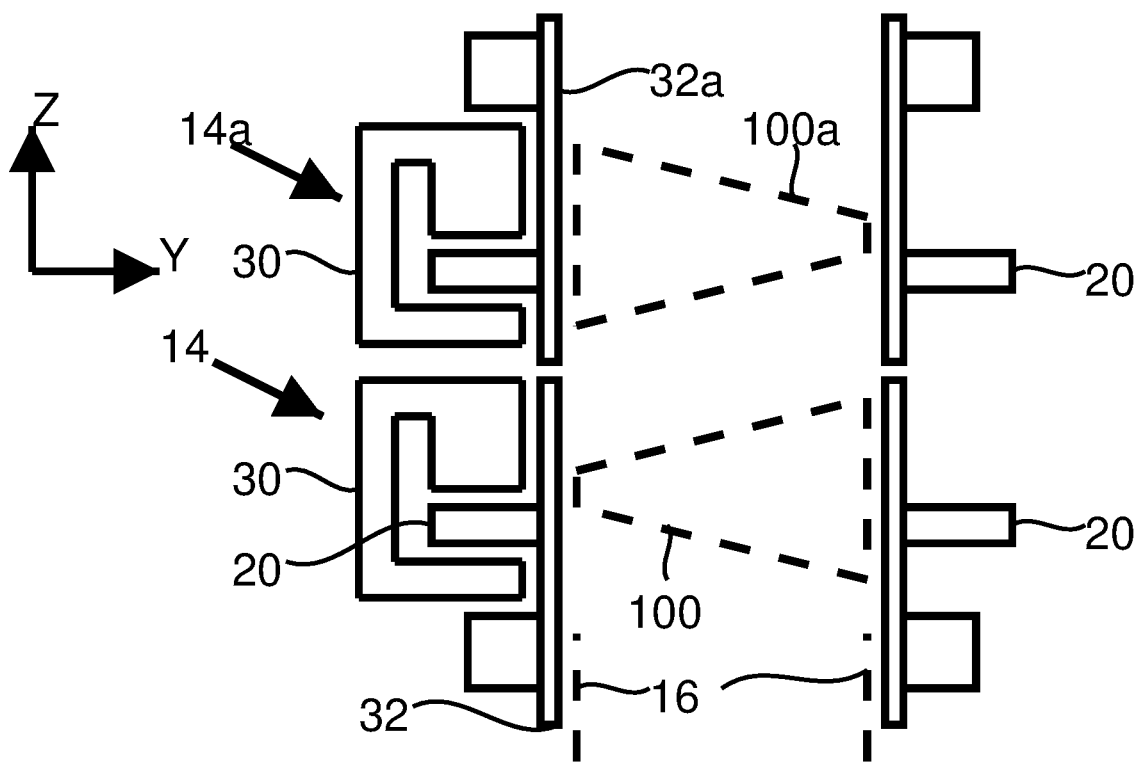

DIRECTABLE LIGHT BEAM HANDLING DEVICE FOR OPTICAL COMMUNICATION

CROSS-REFERENCE TO RELATED APPLICATIONS

This application is a U.S. National Stage application under 35 U.S.C. § 371 of International Application PCT/NL2019/050249 (published as WO 2019/212337 A1), filed Apr. 29, 2019, which claims the benefit of priority to Application EP 18170184.8, filed Apr. 30, 2018. Benefit of the filing date of these prior applications is hereby claimed. Each of these prior applications is hereby incorporated by reference in its entirety.

FIELD OF THE INVENTION

The invention relates to a directable light beam handling device, and a satellite comprising a directable light beam handling device.

BACKGROUND

Optical satellite laser communication involves use of a directable light beam handling device that can act as a source and/or receivers for transmitting and/or receiving light beams from controllable directions, e.g. to and from other satellites or to ground stations. In the directable light beam handling device the light is produced or received using an optical assembly that includes a telescope (more generally a beam expander), a laser and/or a photo-dectector, as well as one or more rotatable mirrors. An example of such a directable light source is described in an article by Mussett, D., et al. titled "Contraves optical terminal-Coarse Pointing Assembly (CPA)." Published at the 10th European Space Mechanisms and Tribology Symposium. Vol. 524. 2003.

Rotatable mirrors may be included in the path between the laser and/or detector and the telescope for example. This has the advantage that small mirrors can be used, which can be used for dynamic tracking. However, mirrors at such a location can redirect the light beam only over a relatively narrow range of directions. To cover a wider range, the telescope effectively needs to be redirected. This is preferably done with one or more rotatable mirrors beyond the opening of the telescope, so that the telescope itself need not be rotated. The telescope has a wide beam width of e.g. 10-100 mm diameter or more at the opening. When the directable light beam handling device is used as a light source, laser light is fed to the telescope, which converts the laser light into a light beam with such a diameter. This light beam is directed to the rotatably mounted mirror, which reflects the beam into a desired direction. When the directable light beam handling device is used as a receiver, the rotatably mounted mirror reflects light from a selectable direction into the telescope.

The rotatably mounted mirror should preferably provide for smooth orientation adjustment. Moreover, the rotation mechanism should preferably compact, light weight and constructionally simple.

SUMMARY OF THE INVENTION

Among others, it is an object to provide for a compact, simple smoothly directable light beam handling device.

A directable light beam handling device according to claim 1 is provided. Because the mirror rotation mechanism uses a rotatable ring that at least partly encircles the expanded beam or around the beam expander to rotate the mirror, a compact design is realized. Preferably, the ring entirely encircles the beam axis, but if a limited angle control range suffices, the ring may be a partial ring that encircles the beam axis only over part of a full circle. Because the force transmission is implemented using electromagnets and the soft magnetic material of the ring no permanent magnet is needed in the force transmission. This provides for smooth angle adjustment and makes it easier to orient the ring within an accuracy smaller than the distance between the edges. No gears or cable connections to the ring are needed.

In a preferred embodiment the ring extends in a plane perpendicular to the axis of the beam, the elevations formed by the ridges extending in the axis direction of the beam, the ridges extending radially along the surface of the ring. Alternatively, a ring with radially extending ridges may be used. But this may result in a more bulky design.

In a preferred embodiment the yoke runs around an edge of the ring, from the first end portion to the second end portion, the first and second end portion facing the surface of the ring and a further surface the ring opposite to said surface of the ring respectively. This makes it possible to exert a strong torque on the ring over a small range of positions.

In an embodiment, the directable light beam handling device comprises a control circuit, the control circuit having current supply outputs coupled to respective ones of the electromagnets and a switching circuit configured to select to the excitation coil around the yoke of which of the electromagnets current will be supplied. Alternatively a control circuit may be used that is not part of the device.

In an embodiment the device comprises a sensor device configured to measure a position of the ridges relative to the sensor device, the control circuit having a control input coupled to the sensor device, the control circuit being configured to control current supply to the electromagnets dependent on an output signal of the sensor device. In a further embodiment, the sensor device comprises a magnetic field source and a magnetic field detector facing the surface of the ring, configured to produce magnetic field at the ridges and to measure a field from the ridges respectively. Thus, the ring can be used for both sensing and exerting a torque.

In an embodiment, the control circuit is configured to receive or determine information specifying a target orientation of the ring, and to control the current supplied to the electromagnet to rotate the ring to the target orientation. The target orientation may be determined for example according to a predetermined periodic schedule of target orientations, or according to commands received by the control circuits that specify the target orientations, or as a result of signals that a new target orientation is needed to keep a fine angle adjustment system within its operating range.

In an embodiment the control circuit is configured to determine and control the target orientation to a fraction of a distance between the ridges. In this case the sensor results may be used both to count the number of ridges that pass the sensor during rotation and the sub-period accurate position relative to the ridges.

In an embodiment an eddy current damper may be used to add a damping force on the rotation of the ring. In an embodiment the ring is of an electrically conductive material and the device comprises a magnet configured to form an eddy current damper in combination with the ring. A surface of a first pole of the magnet faces the surface of the ring that has ridges and, preferably, a width of the surface of the first pole of the magnet equals an integer number of spatial periods of the ridges, so that no net static magnetic force can result. In another embodiment the eddy current damper comprises a rotatable hollow cylinder, the rotatable ring and a further ring being attached to the outer surface of the hollow cylinder. In this embodiment the damper may act on the further ring that being made of an electrically conductive material like CU, AL or Ag, which need not be magnetic.

BRIEF DESCRIPTION OF THE DRAWINGS

These and other objects and advantageous aspects will become apparent from a description of exemplary embodiments with reference to the following figures.

FIGS. 2 and 3, 3a show part of a mirror rotation mechanism

DETAILED DESCRIPTION OF EXEMPLARY EMBODIMENTS

Figure 1:
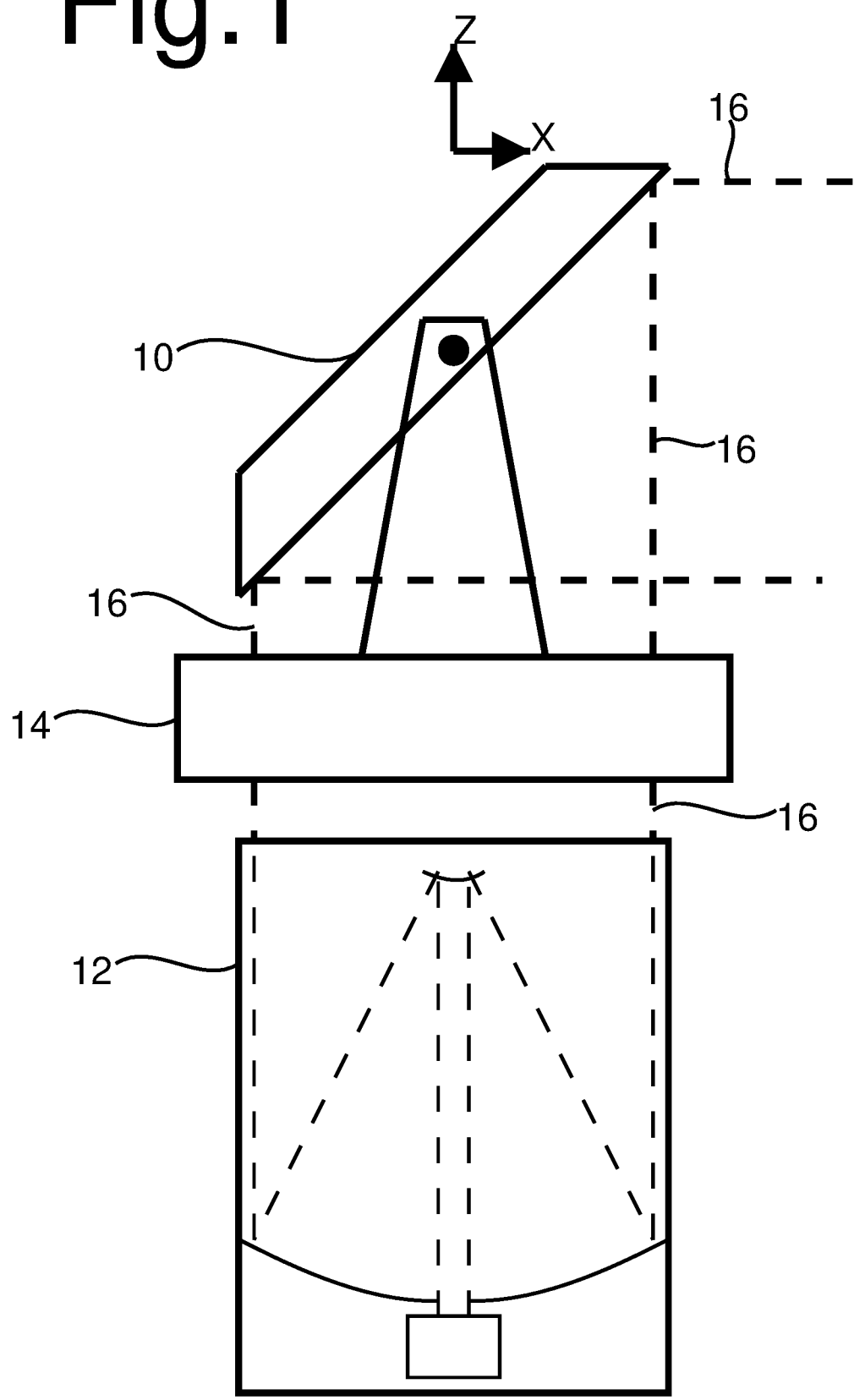
FIG. 1 shows a directable light beam handling device

FIG. 1 shows a directable light beam handling device comprising a mirror 10, an optical assembly 12 and a mirror rotation mechanism 14. Optical assembly 12 may provide for transmission beam generation or beam reception or both. Optical assembly 12 comprises a telescope (more generally a beam widener) and a light source and/or a photo-detector. Furthermore, optical assembly 12 may comprise one or more rotatable mirrors for dynamic fine control of the beam direction. The following description will focus on direction of an outgoing beam, wherein optical assembly 12 acts as a beam former 12, but it should be appreciated that, mutatis mutandis, this description also applies to beam reception.

Mirror rotation mechanism 14 is located between a beam former 12 and mirror 10 (in another embodiment, beam former 12 may even be located partly within mirror rotation mechanism 14). In operation, beam former 12 directs a light beam 16 through mirror rotation mechanism 14 at mirror 10. Mirror rotation mechanism 14 is configured to rotate mirror 10 around the axis direction of beam 16 (indicated as the Z-axis: in the figures XYZ directions are used to relate the different view directions of different figures).

Figure 1A:
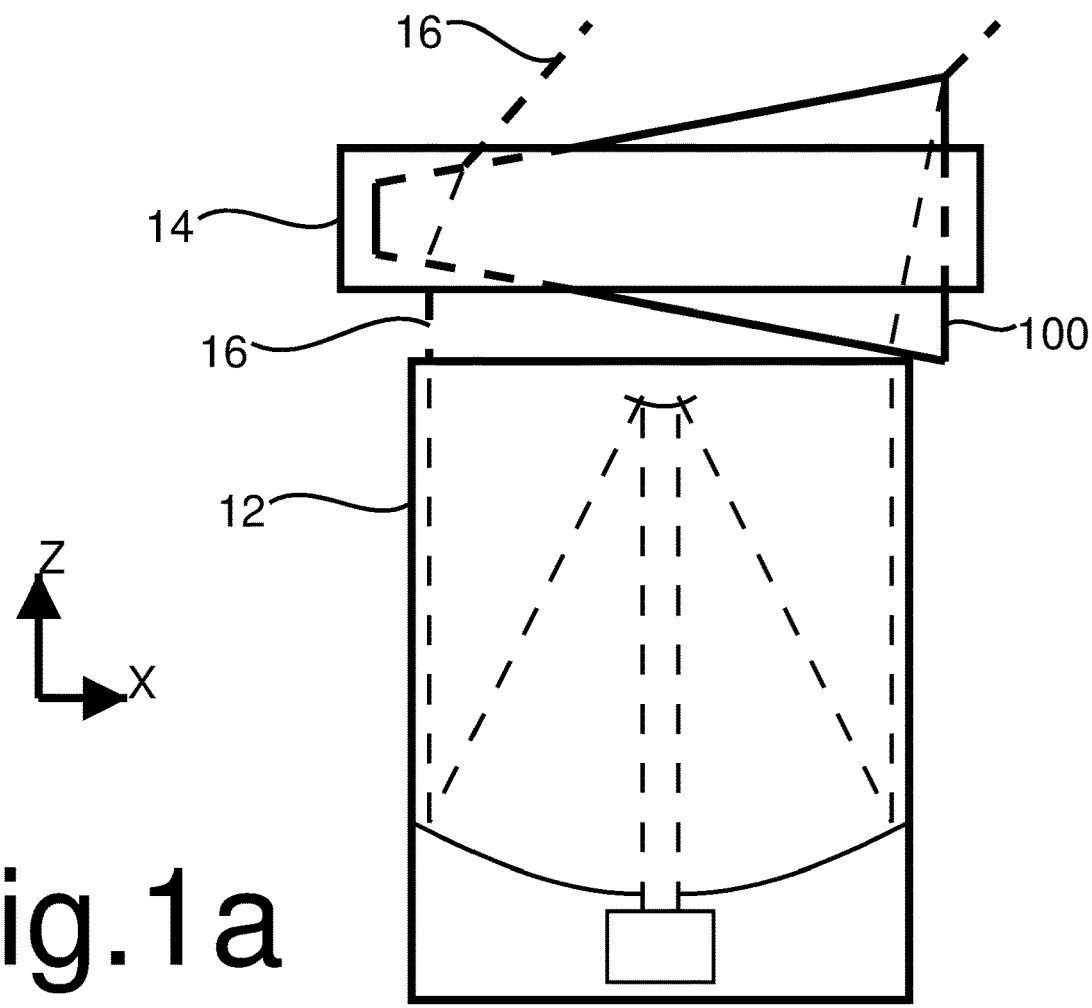
FIG. 1a, b show alternative directable light beam handling devices
Figure 1B:
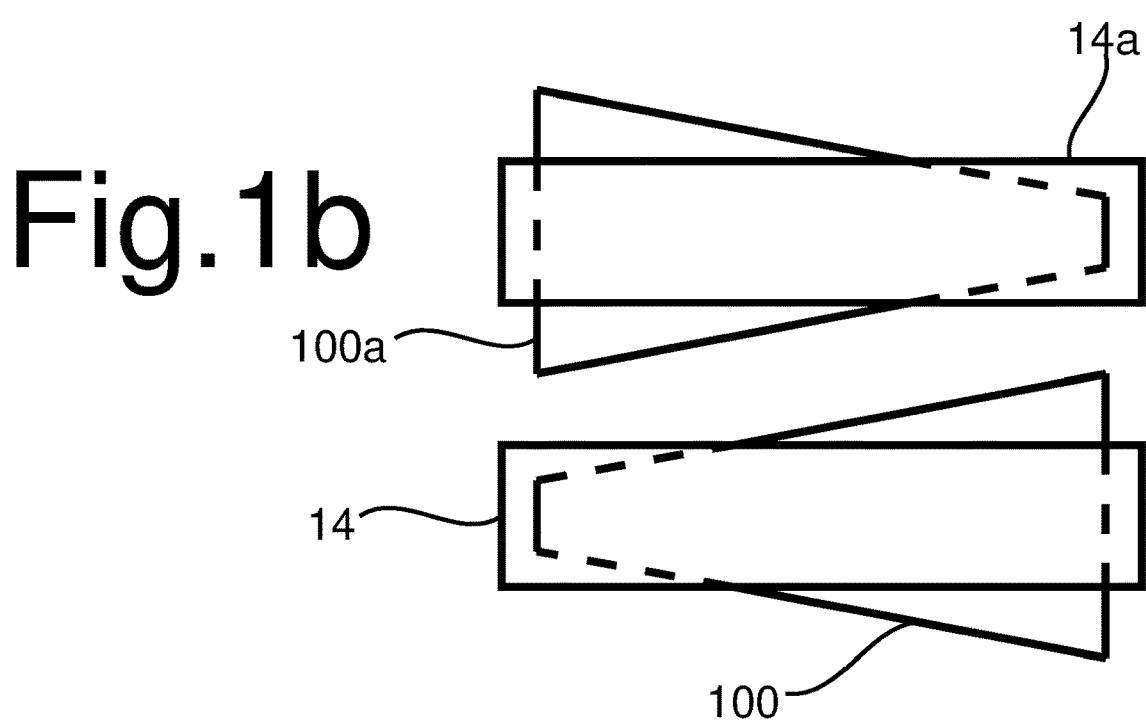

FIG. 1a shows a directable light beam handling device comprising a prism 100 instead of mirror 10. As for mirror 10, Mirror rotation mechanism 14 is configured to rotate prism around the axis direction of beam 16. Due to the refracting action of prism 100, rotation of prism 100 results in redirection of beam 16. FIG. 1b shows part of an embodiment wherein, instead of prism 100 a pair of prisms 100, 100a is used attached to respective coaxial mirror rotation mechanisms 14, 14a. The mirror rotation mechanisms 14, 14a provide for independent coaxial rotation of prisms 100, 100a, which in turn 100 provides for redirection of beam 16 at a selectable angle to the original beam direction and around the original beam direction.

Similarly, in addition to mirror rotation mechanism 14, the directable light beam handling device of FIG. 1 may contain a further mirror rotation mechanism (not shown) to rotate mirror 10 at least over a limited angle range around the Y axis or another prism or mirror (not shown) to apply a further rotation to beam 16. Such a further mirror rotation mechanism may be omitted is only rotation around the z-axis is required. If used, the further mirror rotation mechanism may be functionally located between mirror 10 and mirror rotation mechanism 14. Any type of rotation mechanism may be used in the further mirror rotation mechanism, including a mechanism as described for mirror rotation mechanism 14.

Optical assembly 12 may comprise further beam direction control mechanisms (not shown) such as rotatable mirrors in the part of the beam path where the beam is a narrow beam. Such beam direction control mechanisms can be much faster and lighter in weight than mirror rotation mechanism 14, but their direction control range is limited by the telescope (beam expander). Such beam direction control mechanisms may be used as dynamic fine control mechanism of the beam direction, e.g. to keep the beam directed in a target direction e.g. using a feedback loop that contains a spot position sensor and the fine control mechanism to adjust the fine control mechanism to keep the measured position of a spot for produced by a light beam transmitted or reflected by a target constant.

As described, when the beam handling device contains a light source, such as a laser, the mirror rotation mechanisms serve to select the direction of an outgoing light beam. When the beam handling device contains a photo-detector, the mirror rotation mechanisms serve to select the direction from which a light beam will be received. A combination of both may be used. The difference between use of an outgoing light beam and an incoming light beam does not affect the operation of the mirror rotation mechanism.

Figure 2:
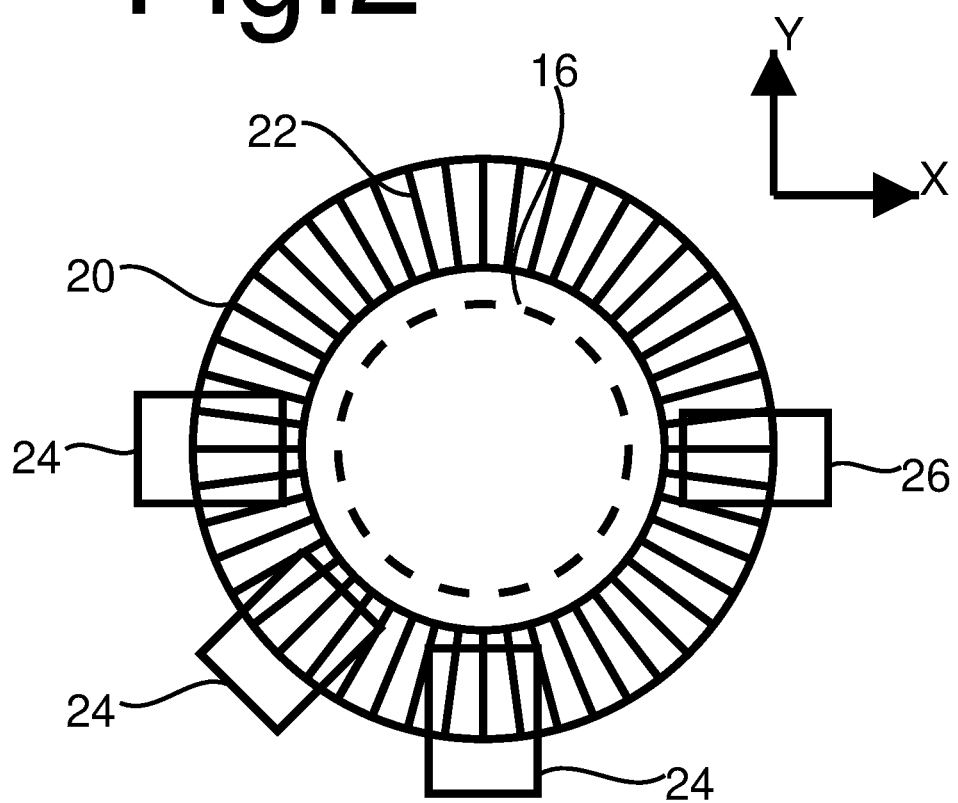

FIGS. 2 and 3 show part of a mirror rotation mechanism 14, comprising a soft magnetic ring 20 around beam 16 substantially in a plane perpendicular to the axis of beam 16. As used herein a soft magnetic material means a material that is magnetizable but has substantially no remanent magnetic field when not subject to an external magnetic field. Ring 20 may be made of a Ni—Fe alloy, Co or Fe for example. Ring 20 includes an array of soft magnetic ridges 22, extending radially along the surface of ring 20, ridges 22 forming elevations of ring 20 in the axis direction of beam 16 (Z-axis). Preferably ridges 22 are provided at periodically repeated angular spacing from each other, defining a spatial (angular) period of a periodic symmetry of ring 20. In an embodiment a hundred twenty ridges 22 are provided, repeated every three degrees (FIG. 2 symbolically shows a smaller number of ridges, only one labeled). Ring 20 encircles beam 16, leaving an opening through which beam 16 travels from beam former 12 to mirror 10 (alternatively, beam former 12 may extend through ring 20). Ring 20 is mounted on a hollow cylinder 32, which in turn is mounted on a bearing 34 that allows cylinder 32 and ring 20 to rotate around the axis direction of beam 16 (Z-axis). Mirror 10 is directly or indirectly attached to cylinder 32, for example on a pair of posts that extend from cylinder 32. Cylinder 32 may be partly open in the sense that it need not everywhere fully encircle beam 16.

FIG. 3a shows an embodiment with a first and second coaxial rotation mechanism 14, 14a for a pair of prisms 100, 100a (symbolically indicated), as shown in FIG. 1b. Each of the coaxial rotation mechanisms contains a ring 20 with an array of soft magnetic ridges as shown in FIG. 2. Both rings 20 encircle beam 16, and the rings 20 are mounted on respective hollow cylinders 32, 32a, which are mounted on respective bearings that allow the cylinders to rotate independently around the Z-axis. In an embodiment, the bearings of both rings are connected to the same frame in the device, so that the rings can be rotated independently, without requiring the other ring to be rotated.

Although embodiments are shown wherein ring 20 entirely encircles the beam, it should be noted that alternatively, a partial ring 20 may be used that only partly encircles ring 20, e.g. over a hundred and eighty degrees or more. Such a partial ring may suffice if only a limited range of orientation adjustment is needed. However an entirely encircling ring is preferred.

Along ring 20 (or each of the first and second ring) at least three electromagnets 24 and a sensor 26 are fixedly mounted (only one shown in FIGS. 3, 3a). Electromagnets 24 serve to drive rotation of ring 20 around the axis of beam 16, and sensor 26 serves to measure the orientation of ring 20, or at least the position of ridges 22 relative to sensor 26. Electromagnets 24 each comprise a soft magnetic yoke 30, running around the outer edge of ring 20, between end portions 31a,b of yoke 30 that face opposite surfaces or ring 20. Yoke 30 may be made of a Ni—Fe alloy, Co or Fe for example. Furthermore, each electromagnet 24 has an excitation coil (not shown) around yoke 30. Electromagnets 24 drive ring based on a principle similar to linear stepper motors.

Figure 4:
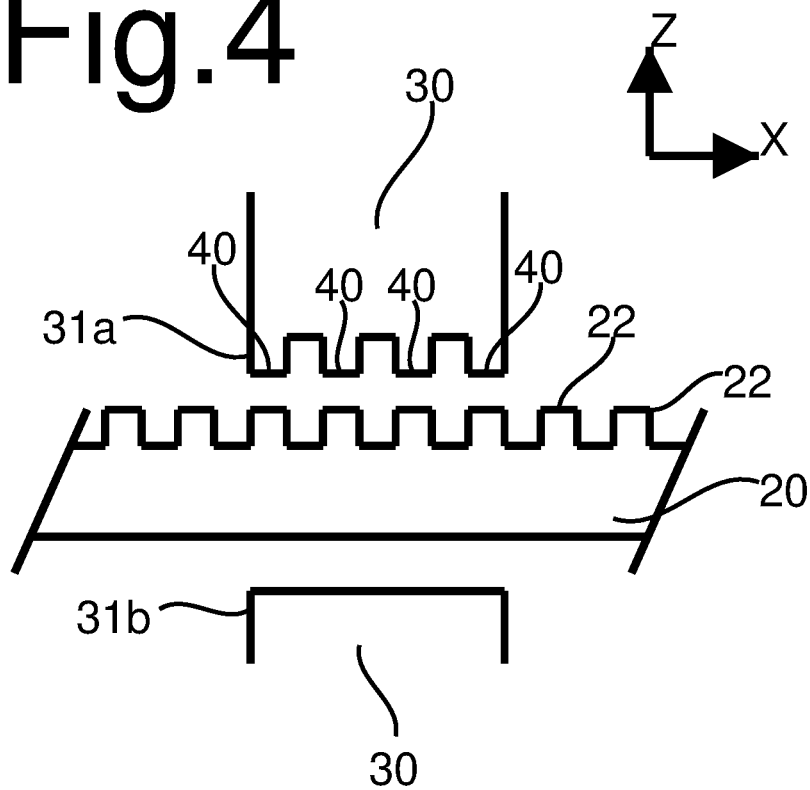
FIG. 4, 4a shows interfaces between a yoke and a ring

As shown in FIG. 4, a first end portion 31a of yoke 30 has ridges 40 elevated from yoke 30 in the direction towards ring 20, substantially parallel with the ridges 22 of ring 20. As shown, the spatial period of ridges 40 on first end portion 31a and ridges 22 on ring 20 is substantially the same. The different electromagnets 24 are mounted relative to each other so that at any time ridges 40 of each electromagnet 24 have a different phase relation to ridges 22 on ring 20. In an embodiment, the ridges may a third of a period out of phase, so that for example if the ridges 40 of a first electromagnet 24 are aligned with the ridges 22 on ring 20 (as shown in FIG. 4, which will be referred to as the zero phase position), the ridges 40 of the other electromagnets 24 will be a third ridge period in advance and behind the zero phase position. Instead of a phase different of a third of a period, a different phase difference may be used, as long as, from a zero phase position of one electromagnet 24, the other electromagnets 24 can be used to pull ring 20 in mutually opposite directions, i.e. that the phase difference with the respective other electromagnets 24 is substantially less than a hundred eighty degrees (e.g. less than a hundred fifty degrees) in respective opposite directions.

Figure 4A:
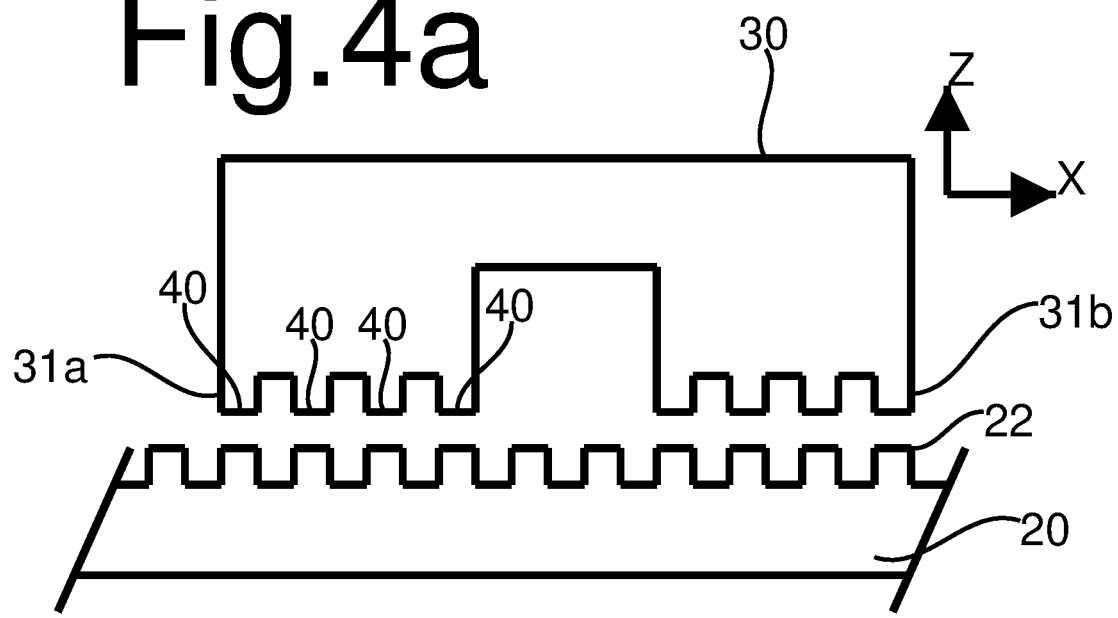

FIG. 4a shows an alternative embodiment, wherein yoke 30 of one or more of the electromagnets has poles above different positions along ring 20 on the same side of ring 20. In this case both poles may contain ridges. In a further embodiment the electromagnet may comprise a plurality of yokes and successive ridges or groups of ridges on the yokes with may alternately have different magnetic polarity. Furthermore, although yokes with a plurality of ridges at each magnetic pole are shown, a single ridge on a magnetic pole may suffice. In an embodiment an extension may be added to the soft magnetic yoke 30 of FIG. 4a, the extension extending to a further pole surface facing ring 20 and a permanent magnet may be included in the extension. In this case the coil around the yoke may be used to modulate the field at ring 20 due to the permanent magnet. In an embodiment the further pole surface also contains ridges spaced like those on ring. Alternatively, the further pole surface may have a width in the circumferential direction of the ring equal to an integer number of spatial periods of the ring and no ridges, so that the further pole surface will not exert a net circumferential force.

In operation, when electric current through the excitation coil of a first electromagnet 24 is used to magnetize yoke 30, yoke 30 creates a magnetic field between end portions 31a,b of yoke 30, through ring 20, magnetizing ring 20 as well. The maximum strength of the magnetic field will occur at the top of ridges 22, 40, causing forces that pull ridges 22, 40 towards the zero phase position shown in FIG. 4, thus creating a torque on ring 20 that causes ring 20 to rotate in the direction of the nearest zero phase position. Once forces ridges 22, 40 of the first electromagnet 24 approach the zero phase position, electric current through the excitation coil of a second electromagnets 24 may be used to maintain the torque in the same direction, keeping ring 20 in rotation. Thus, by supplying alternating electric currents that are successively hundred twenty degrees out of phase, ring 20, and with it mirror 10, can be rotated over any angle, to change the direction in which beam 16 is reflected.

In an embodiment, sensor 26 comprises an magnetic field excitation coil and at least two a Hall sensors configured to measure the magnetic field as affected by ring 20 (i.e. mainly the field from ridges 22) at circumferentially displaced positions along ring 20 at different circumferential offset to the period of ridges 22. Thus, the signals from the Hall sensors are indicative of the orientation of ring 20 at sub-period resolution, and period counting during rotation of ring 20 can be used to determine the number of periods over which the ring is rotated. Alternatively, a pair of pick-up coils may be used instead of the Hall sensors. The device may comprise an alternating carrier current generator, configured to supply an alternating carrier current to a coil such as the coil of first electromagnet 24. The device may comprise a self-inductance measurement circuit configured to measure inductance variations of the coil using the carrier current. For example the inductance measurement circuit may be an alternating voltage and/or current amplitude detector. When a predetermined carrier current amplitude is supplied, the measured voltage is indicative of the inductance, or when a predetermined carrier voltage is supplied, the measured current is indicative of the inductance. Alternatively, the inductance may be determined from a voltage/current ratio.

The self-inductance varies with the position of ridges 22 on ring 20 relative to ridges 40 on yoke 30. Thus, the coil inductance can be used to measure position changes. Optionally, such self-inductance measurements may be performed using each of a plurality of the electromagnets (e.g. on two or three electromagnets), which have ridges out of phase with each other relative to ridges on ring (20). In this way, both position changes and the direction of these position changes can be measured. Instead of the coil of first electromagnet 24 another coil that is configured to generate a magnetic field through ring 20 via further ridges may be used for such self-inductance measurements.

It may be noted that sensor 26 may exert a torque on ring 20, which could affect rotation of ring 20. However, sensor 26 preferably uses an AC field at a frequency that is sufficiently high to prevent a significant effect on rotation. Also, the magnetic field from sensor 26 may be kept so small that it does not significantly affect rotation. In an embodiment, the size of the magnetic field excitation coil of sensor 26 is selected in correspondence with the spatial period of ridges 22 so as to minimize the net torque on ring 20 due to the magnetic field excitation coil. In other embodiments, sensor 26 may be an optical sensor, configured to determine the position of ridges 22 relative to sensor 26 from light reflection from ridges 22, a capacitive sensor or a mechanical sensor for sensing the position of ridges 22 relative to sensor 26 from the position of ridges 22.

Although only one sensor 26 is shown, it should be appreciated that instead a plurality of sensors may be provided in parallel at different positions along ring 20 to serve as back up when one of the sensors fails. Similarly, more than three electromagnets at different positions along ring 20 may be used to serve as back up.

Figure 5:
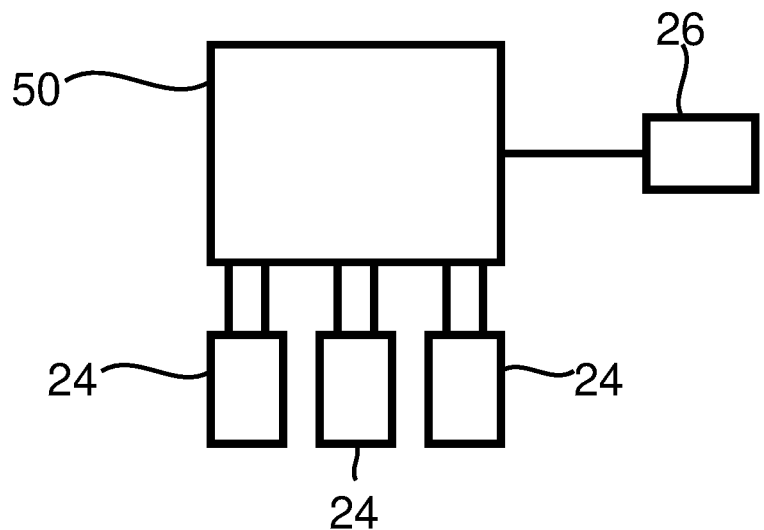
FIG. 5 shows a control circuit

FIG. 5 shows a control system of the directable light beam handling device, comprising a control circuit 50 with outputs coupled to the excitation coils of the electromagnets 24 and an input coupled to sensor 26. Control circuit 50 comprises a switching circuit configured to select to which of the electromagnets electric current will be supplied. Control circuit 50 may comprise a computer and computer program storage device comprising a computer program including computer instructions for causing control circuit 50 to perform its functions. Where it is described that control circuit 50 performs described actions, or is configured to do so, this is used to indicate that in the embodiment with the computer the computer program contains instructions to make the computer control these actions. However, part or all of the functions may alternatively be performed by control circuit parts that are dedicated to these functions.

Control circuit 50 is configured to effect orientation changes of mirror 10, to direct the beam to selected target directions. Control circuit 50 may be configured to so periodically, according to a predetermined set of target directions, or in response to reception of commands to direct the beam into selected target directions specified by the commands. Furthermore, control circuit 50 may be configured to effect orientation changes of mirror 10 when the device uses a dynamic fine control mechanism in a spot position based feedback loop and this dynamic fine control mechanism approaches a boundary of its control range. Upon detection that this is so, control circuit 50 sets a new target position for the mirror rotation mechanism to move the feedback position of the dynamic fine control mechanism to move away from the boundary.

To direct the beam to a selected target direction, control circuit 50 determines the number of ridges 22 over which ring 20 should be rotated and the position of the ridges 22 relative to electromagnets 24 that ring should assume. Optionally, this may depend on the selected target direction and an orientation of the device measures e.g. by an inertial sensor of a satellite that contains the device.

Control circuit 50 supplies current through the excitation coils of the electromagnets 24 to apply a torque to ring 20, which causes ring 20 to rotate. The torque initially determines the acceleration of the rotation speed of ring 20, and if maintained, the rotation speed of ring 20 at which the torque balances friction. If a limit must be imposed on the rotation speed, control circuit 50 may set the torque, i.e. the current supplied to the excitation coils of electromagnets 24, to a level selected in order to balance the friction at the maximum rotation speed, or apply the torque intermittently. Alternatively, control circuit may initially select the current level to accelerate ring 20 to the desired rotation speed and reduce the desired rotation speed has been reached by reducing the currents supplied to electromagnets 24 once the maximum rotation speed has been reached or by supplying the current intermittently.

The torque may be generated for example by applying current by cyclically selected ones (or pairs) of electromagnets 24, so that the force exerted between electromagnets 24 and ridges 22, if any, is always in the same circumferential force direction. Control circuit 50 may be configured to define predetermined ranges of phase positions and associated electromagnets 24 to which current should be supplied to obtain a force in the required direction when in the respective ranges. Control circuit 50 may use the output signal of sensor 26 to select the electromagnet 24 (or electromagnets 24) to which the current will be supplied according to these ranges.

Control circuit 50 further uses the output signal of sensor 26 to count the number of ridges that has passed sensor 26 during the rotation due to the torque. Eventually the count of the number of ridges will indicate that ring 20 is within a predetermined distance from the selected position, e.g. after passing the last ridge 22 before the selected position. At this stage the position relative to the ridges, rather than the count of the number of ridges is used to determine the current through electromagnets 24. Control circuit 50 may use feedback loop control to control positioning.

Any suitable feedback method may be used. During feedback loop control, control circuit 50 determines a desired force (corresponding to a torque) to be applied to ring 20 and causes electromagnets 24 to generate the desired force. Control circuit determines the desired force from a signal from sensor 26 and the position of the ridges 22 relative to electromagnets 24 that has been determined from the selected target position. The desired force is selected to create a torque to start a rotation of ring 20 in a direction that reduces the size of the difference between the target position and the sensed position and, if applicable, the speed of rotation. Given the desired size and direction of the force and the phase position of electromagnets 24 relative to ridges 22, control circuit 50 selects the electromagnet 24 or electromagnets 24 to which current should be applied, and the size of this current. It may be noted that during feedback the sign of the desired force may change, which affects the selection of the electromagnets 24.

The desire forces may be determined dependent on the current difference between the position relative to the ridges 22 indicated by sensor 26 and the position of the ridges 22 relative to electromagnets 24 that has been determined from the selected target position, and optionally the current speed of rotation, as determined by sensor 26. For example, the feedback loop may be configured to determine a desired force that is a sum of the difference and the current speed of rotation, multiplied by respective factors, which results in a feedback loop similar to a PID-type feedback loop.

It may be noted that, because of the absence of permanent magnets in ring 20 and electromagnets 24 ring 20 can be moved to any target position without need to maintain a current once ring 20 is at the target position as long as the ring is not disturbed by external forces. In other words, ring 20 has no discrete "favorite positions". This improves the smoothness of the motion. The acceleration and deceleration of the rotation of ring 20 is proportional to a sum of the force generated using electromagnets 24 and friction forces, the later serving to keep ring 20 in position or slowing down ring 20 when electromagnets 24 do not receive current.

Figure 6:
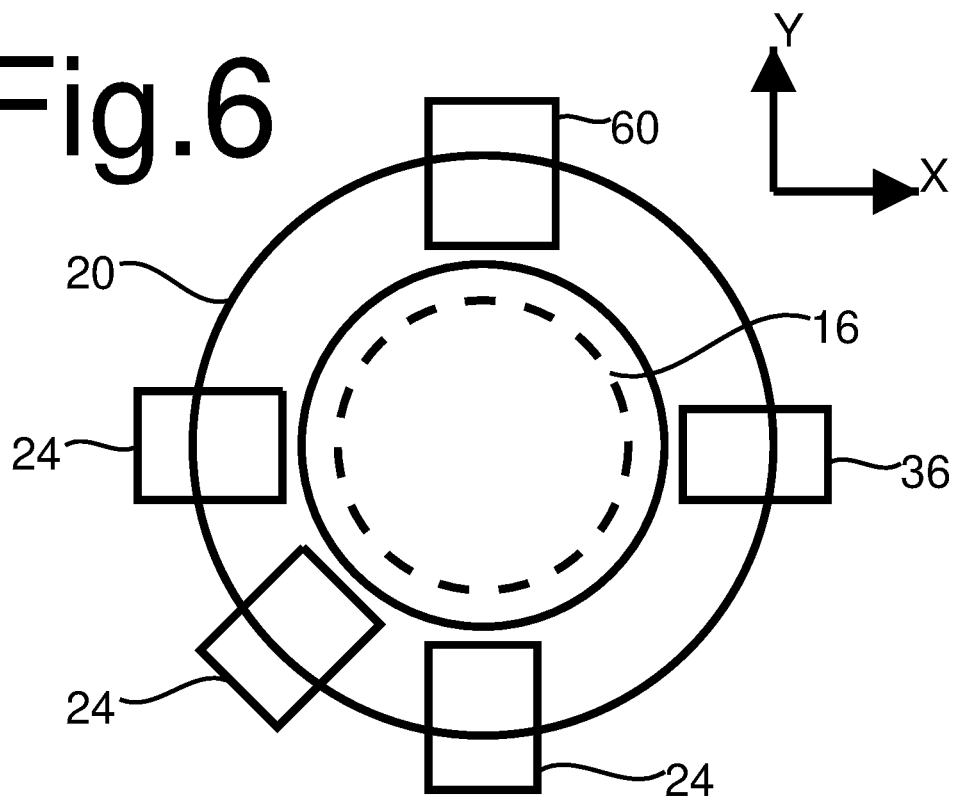
FIG. 6, 6a show embodiments with an eddy current damper

FIG. 6 shows an embodiment wherein an additional eddy current damper 60 has been added over ring 20, which is electrically conductive in this embodiment. As is known per se, eddy current damping is an effect that occurs a magnet is used to direct a magnetic field perpendicularly or more generally transverse to a surface of a electrically conductive plate that moves in a direction parallel to this surface. In the embodiment of FIG. 6, ring 20 is used as the plate. Eddy current damper 60 may comprise a permanent magnetic yoke with poles facing opposite surfaces of ring. Preferably the poles of this yoke extend in the circumferential direction of the ring over an integral number of spatial periods between ridges 22, so as to avoid causing a static magnetic force on ring 20. Alternatively, an electromagnet may be used. When ring 20 is electrically conductive, eddy current damper 60 exerts a rotation damping force on ring when ring 20 is in motion. Eddy current damper 60 may be used to reduce the effect of external forces, thus reducing the need to use electromagnets 24 for this purpose. Furthermore, eddy current damper 60 reduces the maximum speed of rotation.

Figure 6A:
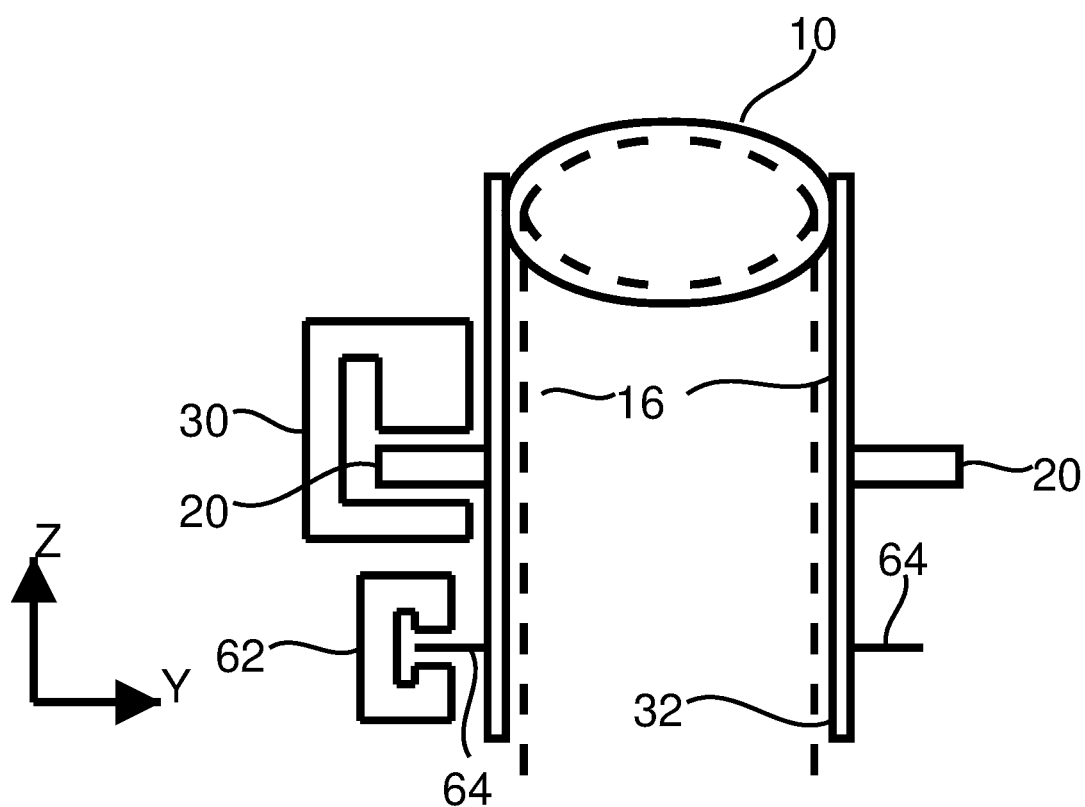

FIG. 6a shows an alternative wherein a separate electrically conductive ring 64 attached to cylinder 32 is used, with a one or more magnets 62 forming eddy current dampers in combination with the separate electrically conductive ring 64. Magnet 62 has a magnetic yoke with poles facing opposite surfaces of electrically conductive ring 64. Electrically conductive ring 64 may be made of highly conductive, but not necessarily magnetic material. Cu, Ag or Al may be used for example. In this way direct application of the magnetic field of the eddy current damper to the magnetic ring with the ridges is avoided.

The feedback may be used to compensate for the effect of external forces. When ring 20 initially stands still at a desired position, the effect of external forces first shows up from the sensor output from the fact that the ring starts rotating, and subsequently by a deviation from the target position. The force generated by electromagnets 24 is used to reverse that acceleration and reduce the rotation once the rotation angle approaches the desired phase position.

An embodiment has been show with a ring 20 that has ridges 22 on a surface that is perpendicular to the beam direction. Alternatively, a ring around the beam with ridges on a cylindrical surface parallel to the beam direction may be used. However, in this embodiment more space may be needed within the ring, to provide magnetic poles within the ring. Moreover, the effects obtained with such a ring may be more sensitive to thermal expansion.

The invention claimed is:

1. A directable light beam handling device, comprising
a mirror or prism;
a beam expander configured to direct a light beam to the mirror or prism and/or receive a light beam from the mirror or prism;
a rotatable ring of soft magnetic material at least partly encircling a path of the beam or the beam expander, the mirror or prism being coupled to the rotatable ring, so as to rotate the mirror or prism together with the ring, the ring including an array of soft magnetic ridges, forming elevations extending from a surface of the ring;
at least three electromagnets, each comprising a soft magnetic yoke, having poles at a first and second end portion of the yoke, the first and second end portion facing the ring, the pole at the first end portion pole facing said surface of the ring, the first end portion having ridges elevated from the yoke in the direction towards the ring, in parallel with the ridges of the ring.

2. A directable light beam handling device according to claim 1, wherein the ring extends in a plane perpendicular to the axis of the beam, the elevations formed by the ridges extending in the axis direction of the beam, the ridges extending radially along the surface of the ring.

3. A directable light beam handling device according to claim 1, wherein the yoke runs around an edge of the ring, from the first end portion to the second end portion, the first and second end portion facing the surface of the ring and a further surface the ring opposite to said surface of the ring respectively.

4. A directable light beam handling device according to claim 1, wherein the ring entirely encircles the path of the beam or the beam expander.

5. A directable light beam handling device according to claim 1, wherein each of the electromagnets comprises an excitation coil around the yoke of the electromagnet, the directable light beam handling device further comprising a control circuit, the control circuit having current supply outputs coupled to respective ones of the electromagnets and a switching circuit configured to select to which of the electromagnets current will be supplied.

6. A directable light beam handling device according to claim 5, comprising a sensor device configured to measure a position of the ridges relative to the sensor device, the control circuit having a control input coupled to the sensor device, the control circuit being configured to control current supply to the electromagnets dependent on an output signal of the sensor device.

7. A directable light beam handling device according to claim 6, wherein the sensor device comprises a magnetic field source and a magnetic field detector facing the surface of the ring, configured to produce magnetic field at the ridges and to measure a field from the ridges respectively, or the sensor device comprises a measuring circuit configured to measure self-inductance variations of at least one of the electromagnets.

8. A directable light beam handling device according to claim 5, wherein the control circuit is configured to receive or determine information specifying a target orientation of the ring, and to control the current supplied to the electromagnet to rotate the ring to the target orientation.

9. A directable light beam handling device according to claim 8, wherein the control circuit is configured to determine and control the target orientation to a fraction of a distance between the ridges.

10. A directable light beam handling device according to claim 1, wherein the ring is of an electrically conductive material, the device comprising a magnet configured to form an eddy current damper in combination with the ring.

11. A directable light beam handling device according to claim 10, wherein a surface of a first pole of the magnet faces said surface of the ring and a width of the surface of the first pole of the magnet equals an integer number of spatial periods of the ridges.

12. A directable light beam handling device according to claim 1, comprising a rotatable hollow cylinder, the rotatable ring being attached to an outer surface of the hollow cylinder, the device comprising
a further ring attached to the outer surface of the hollow cylinder, the further ring being made of an electrically conductive material;
a permanent magnet configured to form an eddy current damper in combination with the further ring.

13. A directable light beam handling device according to claim 1, comprising a further rotatable ring, coaxial with said ring and at least partly encircling a path of the beam, the further rotatable ring being of soft magnetic material, the ring including an array of soft magnetic ridges, forming elevations extending from a surface of the ring; and at least three further electromagnets, each comprising a soft magnetic yoke, having poles at a first and second end portion of the yoke, the first and second end portion facing the further ring, the pole at the first end portion facing said surface of the further ring, the first end portion having ridges elevated from the yoke in the direction towards the further ring, in parallel with the ridges of the further ring.

* * * * *